United States Patent [19]

Koch et al.

[11] 3,931,873

[45] Jan. 13, 1976

[54] SYNCHRONIZATION MECHANISM FOR CHANGE-SPEED TRANSMISSIONS

[75] Inventors: Gerhard Koch, Oberboihingen; Hans Heinemann, Weissach, both of Germany

[73] Assignee: Dr. -Ing. H.c.F. Porsche Aktiengesellschaft, Germany

[22] Filed: Apr. 4, 1974

[21] Appl. No.: 458,031

[30] Foreign Application Priority Data

Sept. 28, 1973 Germany............................ 2348795

[52] U.S. Cl.............. 192/53 C; 192/53 A; 192/108
[51] Int. Cl.² ............................................ P16D 11/00
[58] Field of Search .... 192/53 C, 53 F, 53 A, 53 R, 192/108

[56] References Cited
UNITED STATES PATENTS

| | | | |
|---|---|---|---|
| 3,110,382 | 11/1963 | Jones .................................. | 192/53 C |
| 3,158,240 | 11/1964 | Harrington ......................... | 192/53 C |
| 3,200,920 | 8/1965 | Reich .................................. | 192/53 C |
| 3,203,522 | 8/1965 | Schmid ............................... | 192/53 C |

*Primary Examiner*—Samuel Scott
*Assistant Examiner*—Randall Heald
*Attorney, Agent, or Firm*—Craig & Antonelli

[57] ABSTRACT

A synchronization mechanism, especially for change-speed transmissions of motor vehicles, in which a shifting sleeve provided with shifting teeth is being held by a shifting sleeve carrier fixedly arranged on a transmission shaft and is adapted to be coupled—against the action of at least one friction member producing synchronism—with a coupling member of the gear to be shifted or engaged which is provided with shifting teeth; the friction member thereby consists of a slotted and springy synchronizing ring cooperating directly with the shifting teeth of the shifting sleeve which advantageously is under the influence of means increasing the servo-effect thereof; the end surface of the shifting teeth of the shifting sleeve are so constructed that the friction members become again ineffectual after the synchronizing operation is completed before the shifting teeth of the shifting sleeve come into engagement with the shifting teeth of the coupling member.

11 Claims, 5 Drawing Figures

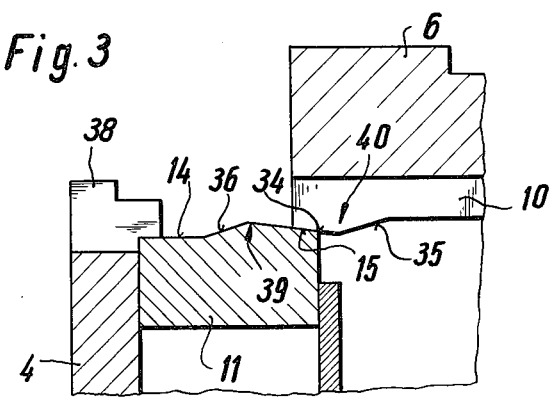
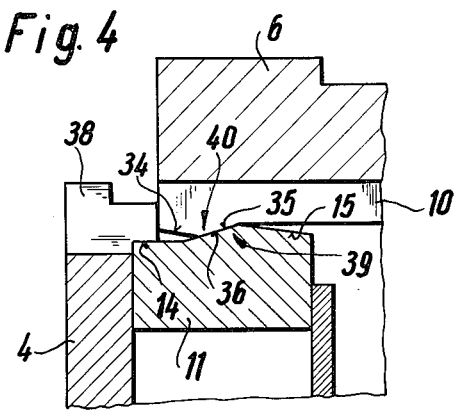
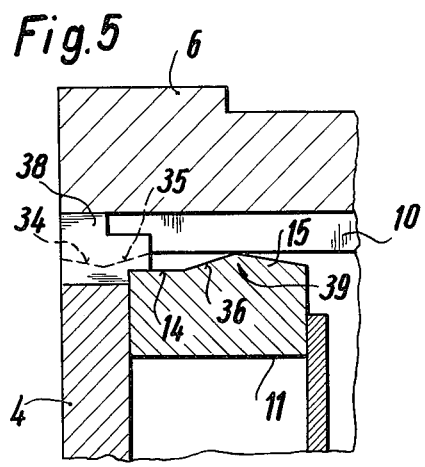

SYNCHRONIZATION MECHANISM FOR CHANGE-SPEED TRANSMISSIONS

The present invention relates to a synchronization mechanism, especially for change-speed transmissions for motor vehicles, in which a shifting sleeve provided with shifting teeth is held by a shifting sleeve carrier fixedly arranged on the transmission shaft and is adapted to be coupled with a coupling member provided with shifting teeth of the gear to be shifted against the effect of at least one friction member producing synchronism, whereby the friction member consists of a slotted and springy synchronizing ring cooperating directly with the shifting teeth of the shifting sleeve, which synchronizing ring is advantageously under the influence of means increasing the servo-effect thereof.

In synchronization mechanisms of this type, the coupling of the shifting teeth of the shifting sleeve with the shifting teeth of the coupling member of the gear to be engaged or shifted, entails considerable difficulties if the teeth of the aforementioned structural parts are not disposed over tooth gaps. This can be traced back to the fact that the blocking force of the synchronizing ring permits a relative movement of the shifting sleeve with respect to the coupling member only with considerable force application. For avoiding this disadvantage, it is already known (German Offenlegungsschrift No. 1,630,948) to arrange means between the centering surface and the friction surface of the synchronizing ring, on which the shifting sleeve, after reaching synchronism, is retained readily rotatable in the circumferential direction with respect to the teeth of the coupling member of the gear to be engaged. As a result thereof, after synchronism is achieved, the shifting sleeve is far-reachingly relieved of the blocking forces of the synchronizing ring and consequently can rotate easily relative to the coupling member. However, in addition to the high manufacturing costs resulting from the numerous additional means, the high susceptibility to trouble of this synchronizing mechanism has proved as particularly disadvantageous which the very complicated construction brings about.

The aim of the present invention resides, in contradistinction thereto, in providing a synchronization mechanism, in which the coupling of the shifting sleeve with the gear to be engaged can be readily realized with simple means and without any mutual hooking of the transmission members.

This is achieved according to the present invention in that the end faces of the shifting teeth of the shifting sleeve are so constructed that the friction members, after a completed synchronizing operation, become again ineffectual before the shifting teeth of the shifting sleeve come into engagement with the shifting teeth of the coupling body. It is advantageous that the end faces of the shifting teeth of the shifting sleeve are provided with formed-on configurations at the end faces thereof, which cooperate with a formed-on configuration of the synchronizing ring and whereby these formed-on configurations are so dimensioned that during the sliding movement of the formed-on configuration of the shifting sleeve over the formed-on configuration of the synchronizing ring, the synchronizing ring is stressed for achieving the synchronism and after the sliding-over movement, the synchronizing ring is unstressed at first and only then the shifting teeth of the shifting sleeve come into engagement with the shifting teeth of the coupling member. The formed-on configuration at the shifting sleeve includes on the side facing the synchronizing ring, a friction surface and on the side opposite the synchronizing ring, a sliding surface and the formed-on configuration at the synchronizing ring includes on the side facing the shifting sleeve, a friction surface and on the side opposite the shifting sleeve, a sliding surface. The shifting operation now takes place in such a manner that during the sliding action of the friction surface of the shifting sleeve over the friction surface of the synchronizing ring, the synchronization operation is initiated by the stressing of the synchronizing ring and as a result of the following sliding movement of the sliding surface of the shifting sleeve over the sliding surface of the synchronizing ring, the synchronizing ring is again permitted to become unstressed and then the shifting teeth of the shifting sleeve come into engagement with the shifting teeth of the coupling member.

The advantages achieved with the present invention reside in particular in that the synchronizing ring and the means increasing the servo-effect are able to become unstressed prior to engagement of the shifting teeth of the shifting sleeve with the shifting teeth of the coupling member so that the blocking action is reduced and a rotation of the shifting sleeve with respect to the coupling member is possible. It is achieved thereby that even when the teeth of the shifting sleeve and the teeth of the coupling member are not disposed opposite gaps, the teeth can engage with each other without the application of a large amount of force and without additional devices.

These and further objects, features, and advantages of the present invention will become more apparent from the following description when taken in conjunction with the accompanying drawing which shows, for purposes of illustration only, one embodiment in accordance with the present invention, and wherein:

FIGS. 3 to 5 are partial cross-sectional views, taken within the area of the section A of FIG. 1 and illustrating the individual formed-on configurations during the individual phases of the shifting operation.

Figure 1:
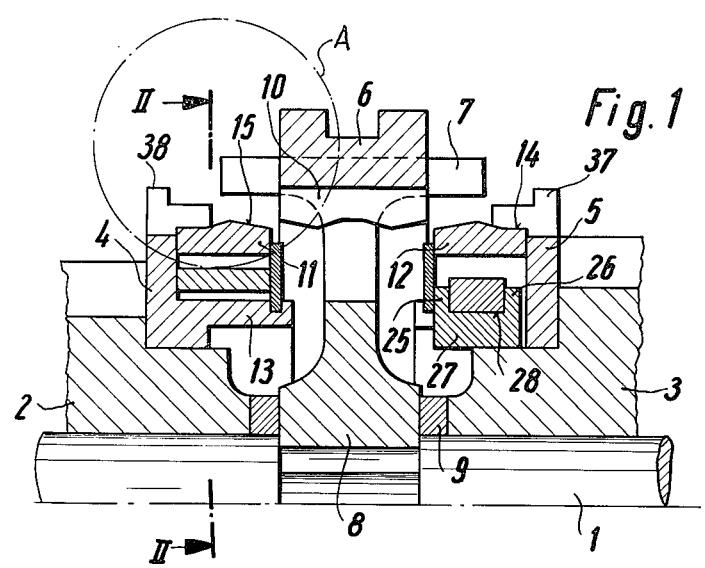
FIG. 1 is a partial longitudinal cross-sectional view through the synchronization mechanism according to the present invention for the first speed of a shifting-sleeve transmission of a motor vehicle.
Figure 2:
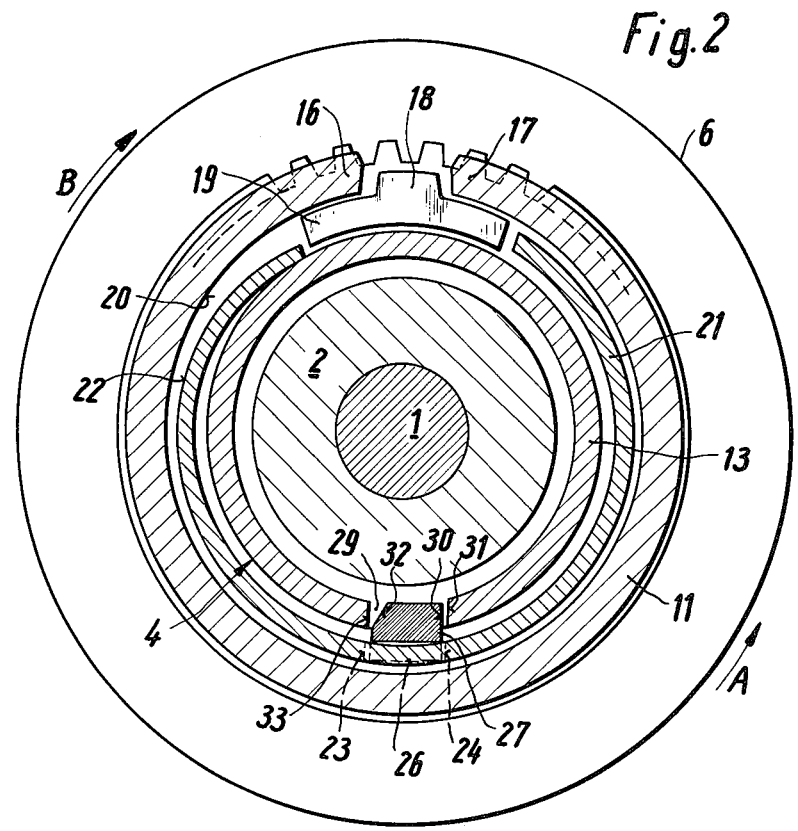
FIG. 2 is a cross-sectional view, taken along line II—II of FIG. 1.

Referring now to the drawing wherein like reference numerals are used throughout the various views to designate like parts, and more particularly to FIGS. 1 and 2, in the transmission section illustrated in these figures, gears 2 and 3 are freely rotatable but longitudinally non-displaceably supported on a transmission shaft indicated by reference numeral 1. The gears 2 and 3 are in constant meshing engagement with gears (not shown) disposed on a further transmission shaft (not shown) and are fixedly connected with coupling members or bodies 4 and 5. The coupling members 4 and 5 are adapted to be coupled with a shifting sleeve 6 which is axially displaceably held on webs 7 of a shifting sleeve carrier 8. The shifting sleeve carrier 8 is non-rotatably connected with the transmission shaft 1 and is axially fixed between abutment disks 9. The end faces of the shifting teeth 10 of the shifting sleeve 6 cooperate with synchronizing rings 11 and 12 which are arranged under prestress on the hub 13 of the coupling members 4 and 5 of the gears 2 and 3 to be shifted or engaged. Each of the synchronizing rings 11 and 12 is provided with a centering surface 14 and with a friction surface 15. The nose portion 18 (FIG. 2) of a slide member 19 projects between the ends 16 and 17 of the synchronizing ring 11. The slide member 19 is held displaceable in the circumferential direction of the hub 13 of the respective coupling member. A blocking means 21 in the form of a band is arranged between the hub 13 and the inner surface 20 of the synchronizing ring 11, whose surface 22 cooperates with the synchronizing ring 11. The blocking means 21 is provided at the curve bottom with oppositely disposed radial grooves 23 and 24 at its end faces, into which engage the webs 25 and 26 of a loose abutment 27 and whereby the abutment 27 is anchored together with the blocking means 21. The webs 25 and 26 delimit a groove 28 (FIG. 1) extending in the circumferential direction within the abutment 27 which is supported with the side opposite the groove 28 in a recess 29 (FIG. 2) of the coupling member 4 or 5. During a synchronizing operation, the abutment 27 is supported with its perpendicular surface 30 at the perpendicular surface 31 provided at the recess 29 or with the inclined surface 32 at the perpendicular surface 33 of the recess 29. The end surfaces of the shifting teeth 10 of the shifting sleeve 6 are provided witn a friction surface 34 and a sliding surface 35 (FIGS. 3–5). The friction surface 15 and the centering surface 14 of the synchronizing ring 11 are connected with each other by a sliding surface 36. The coupling members 4 and 5 include shifting teeth 37 and 38 which, upon completed synchronism, come into engagement with the shifting teeth 10 of the shifting sleeve 6. The formed-on configuration enclosed by the surfaces 14 and 15 on the synchronizing ring 11 is designated by reference numeral 39 and the formed-on configuration enclosed by the surfaces 34 and 35 in the shifting sleeve 6 is designated by reference numeral 40.

During the engagement of the first speed from the standstill of the vehicle, the shifting sleeve 6 is axially displaced with respect to the sleeve carrier 8 toward the left as viewed in FIG. 1 with a running engine and the friction surface 34 of the shifting sleeve 6 is brought into frictional engagement with the friction surface 15 of the synchronizing ring 11 (FIG. 3) whereby the synchronizing ring 11 is taken along in the direction of rotation A (FIG. 2). As a result of the abutment of the end 17 of the synchronizing ring 11, the slide member 19 is forced in the same direction so that the blocking means 21 actuates the abutment 27 which is then supported with the perpendicular surface 31 at the perpendicular surface 30 of the recess 29 whereby the left portion (FIG. 2) of the blocking means 21 is stressed. During this operation, a relative movement takes place between the inner surface 20 of the synchronizing ring 11 and the surface 22 of the blocking means 21 with a friction work resulting therefrom which becomes effective at the synchronizing ring in the form of a radial expansion force. If synchronism is attained by the friction work between the friction surface 15 and the shifting sleeve 6, on the one hand, and the blocking means 21 and the inner surface 20 of the synchronizing ring 11, on the other, then the synchronization mechanism is unstressed. Consequently, the shifting sleeve 6 can be forced further over the synchronizing ring 11 until the sliding surface 36 of the synchronizing ring 11 slides along the sliding surface 35 of the shifting sleeve whereby the blocking means 21 and the synchronizing ring 11 are unstressed (FIG. 4). Only after the unstressing of the synchronization mechanism, the shifting teeth 10 of the shifting sleeve 6 come in contact with the shifting teeth 38 of the coupling member 4 and as a result of the further displacement of the shifting sleeve 6 toward the left, engage into the same whereby the shifting operation is completed (FIG. 5). When shifting down from the second to the first speed, the shifting sleeve 6 is moved axially with respect to the sleeve carrier 8 toward the right as viewed in FIG. 1, and the friction surface 34 of the shifting teeth 10 are brought into frictional engagement with the friction surface 15 of the synchronizing ring 12 whereby the synchronizing ring 12 is taken along the direction of rotation B (FIG. 2). The abutting end 16 of the synchronizing ring 12 forces thereby the slide member 19 in the same direction so that the blocking means 21 actuates the abutment 27 which is then supported with the inclined surface 32 at the perpendicular surface 33 of the recess 29 whereby the right portion (FIG. 2) of the blocking means 21 is forced to a stronger extent against the inner surface 20 of the synchronizing ring 11 than is the case with the left side of the blocking means 21 so that the friction force between the blocking means 21 and the inner surface 20 of the synchronizing ring 11 is greater than during the engagement of the first speed from standstill of the vehicle. The engagement of the speed now takes place in the same manner as already described.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A synchronization mechanism, especially for change-speed transmissions of motor vehicles, in which a shifting sleeve provided with shifting teeth means is retained at a shifting sleeve carrier means fixedly arranged on a transmission shaft and is operable to be coupled against the action of at least one friction means producing synchronism, with a coupling member of the gear to be engaged, which is provided with shifting teeth means, the friction means including a slotted and spring synchronizing ring means cooperating directly with the shifting teeth means of the shifting sleeve, characterized in that the end surfaces of the shifting teeth means of the shifting sleeve are so constructed that the friction means become again ineffectual, after the synchronization operation is completed, before the shifting teeth means of the shifting sleeve come into engagement with the shifting teeth means of the coupling member.

2. A synchronization mechanism according to claim 1, characterized in that the synchronizing ring means is under the influence of means increasing the servo-effect thereof.

3. A synchronization mechanism according to claim 1, characterized in that the end surfaces of the shifting teeth means of the shifting sleeve are provided with formed-on configurations on the end surface which cooperate with a formed-on configuration of the synchronizing ring means, the formed-on configurations being so dimensioned that during the sliding of the formed-on configuration of the shifting sleeve over the formed-on configuration of the synchronizing ring means, the synchronizing ring means is stressed for achieving synchronism and after the sliding-over movement, the synchronizing ring means is at first unstressed and then the shifting teeth means of the shifting sleeve come into engagement with the shifting teeth means of the coupling member.

4. A synchronization mechanism according to claim 3, characterized in that the formed-on configuration at the shifting sleeve is provided on the side facing the synchronizing ring means, with a friction surface and on the side opposite these synchronizing ring means, with a sliding surface.

5. A synchronization mechanism according to claim 4, characterized in that the formed-on configuration at the synchronizing ring means on the side facing the shifting sleeve is provided with a friction surface and on the side opposite the shifting sleeve means, with a sliding surface.

6. A synchronization mechanism according to claim 5, characterized in that during the sliding of the friction surface of the shifting sleeve over the friction surface of the synchronizing ring means, the synchronizing operation is initiated by the stressing of the synchronizing ring means and as a result of the following sliding movement of the sliding surface of the shifting sleeve over the sliding surface of the synchronizing ring means, the synchronizing ring means again becomes unstressed and then the shifting teeth means of the shifting sleeve come into engagement with the shifting teeth means of the coupling member.

7. A synchronization mechanism according to claim 6, characterized in that the synchronizing ring means is under the influence of means increasing the servo-effect thereof.

8. A synchronization mechanism according to claim 2, characterized in that the formed-on configuration at the synchronizing ring means on the side facing the shifting sleeve is provided with a friction surface and on the side opposite the shifting sleeve means, with a sliding surface.

9. A synchronization mechanism according to claim 2, characterized in that during the sliding of the friction surface of the shifting sleeve over the friction surface of the synchronizing ring means, the synchronizing operation is initiated by the stressing of the synchronizing ring means and as a result of the following sliding movement of the sliding surface of the shifting sleeve over the sliding surface of the synchronizing ring means, the synchronizing ring means again becomes unstressed and then the shifting teeth means of the shifting sleeve come into engagement with the shifting teeth means of the coupling member.

10. A synchronization mechanism according to claim 1, characterized in that during the sliding of a friction surface of the shifting sleeve over a friction surface of the synchronizing ring means, the synchronizing operation is initiated by the stressing of the synchronizing ring means and as a result of the following sliding movement of a sliding surface of the shifting sleeve over a sliding surface of the synchronizing ring means, the synchronizing ring means again becomes unstressed and then the shifting teeth means of the shifting sleeve come into engagement with the shifting teeth means of the coupling member.

11. A synchronization mechanism according to claim 1, wherein the end surfaces of the shifting teeth means and friction surfaces on the synchronizing ring means frictionally engage one another to effect the synchronization operation as said shifting sleeve is moved toward a gear to be engaged, and wherein the end surfaces and friction surfaces are configured such that they are out of frictional engagement with one another when said shifting sleeve is at an axial position in between a position of engagement with teeth of said gear and a position of frictional engagement of said friction surfaces and end surfaces, whereby rotational alignment of said shifting teeth means and the teeth of said gear can be readily accommodated after said synchronization operation without hindrance by frictional engagement of said shifting sleeve with said synchronizing ring.

* * * * *